Figure 1:
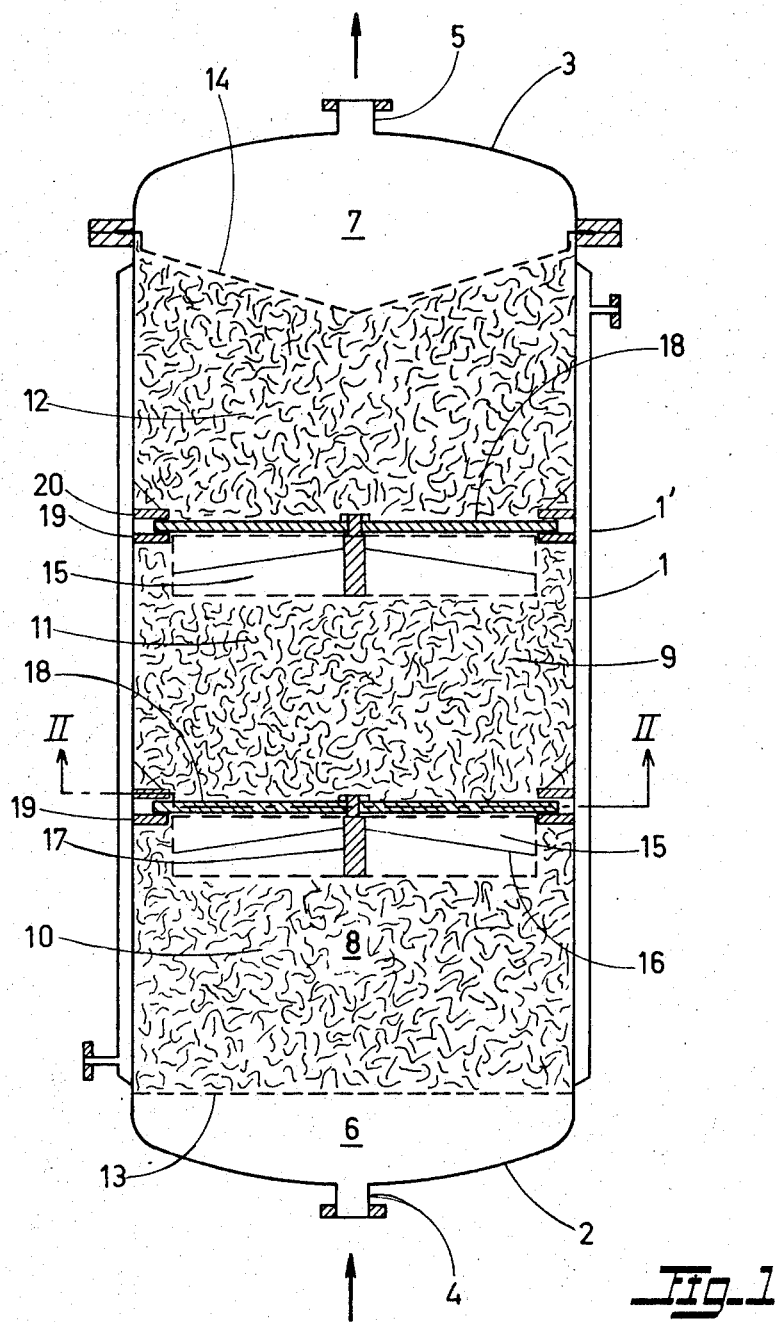

United States Patent
Dasek et al.

[11] 3,859,067
[45] Jan. 7, 1975

[54] FILTER

[75] Inventors: Jaroslav Dasek, Yverdon; Yvan Padly, Tour-de-Peilz, both of Switzerland

[73] Assignee: Societe D'Assistance Technique Pour Produits Nestle S.A., Lausanne, Switzerland

[22] Filed: Dec. 18, 1973

[21] Appl. No.: 425,723

[30] Foreign Application Priority Data
Dec. 28, 1972  Switzerland...................... 18993/72

[52] U.S. Cl. .................................... 55/485, 55/269
[51] Int. Cl. ............................................ B01d 27/02
[58] Field of Search ............ 55/319, 269, 323, 485, 55/516–519

[56] References Cited
UNITED STATES PATENTS
758,222    4/1904   Stone .................................. 55/322
1,751,915  3/1930   Hall et al. ........................... 55/322
3,557,536  1/1971   Ririe .................................... 55/269
3,795,089  3/1974   Reither ................................ 55/233

FOREIGN PATENTS OR APPLICATIONS
808,806    2/1959   Great Britain ...................... 55/485

Primary Examiner—Bernard Nozick
Attorney, Agent, or Firm—Watson leavenworth Kelton & Taggart

[57] ABSTRACT

A filter for gaseous fluids comprises a housing having an inlet and an outlet for the gaseous fluid and containing a filter material which is disposed in at least two compartments arranged in series within the housing, with the face of each compartment opposite an adjacent compartment being at least in part defined by a permeable wall, and the facing permeable walls of two adjacent compartments being separated by an empty space.

2 Claims, 2 Drawing Figures

FILTER

The present invention is concerned with a filter for geseous fluids.

The filtration of gases, for the purpose of removing impurities such as dust, suspended particles and/or micro-organisms, involves passing the gas through one or more filters containing a permeable material such as cotton, glass wool or asbestos fibres or a porous, granulated or sintered material, is a technique employed in numerous industrial activities. In particular, gases used in industrial fermentation processes are often sterilised by filtration. However, the efficiency of filtration, in particular in achieving sterilisation the gaseous fluid, may be influenced, and even impaired, by anomalies in the flow pattern of the gas through the filter material. Thus, there is a possibility of channeling, which is the preferential flow of the gaseous fluid in localised zones of the filter, with the gas forcing a passage along the preferential flow channels formed in the body of the filter material.

The present invention provides a particularly simple yet highly efficient filter for gaseous fluids. This filter is a housing having an inlet and an outlet for the gaseous fluid and containing a filter material which is disposed in at least two compartments arranged in series within the housing, with the face of each compartment opposite an adjacent compartment being at least in part defined by a permeable wall, and the facing permeable walls of two adjacent compartments being separated by an empty space.

The expression "compartments arranged in series" should be understood with respect to the flow of the gaseous fluid, which means that compartments arranged in series are successively traversed by the same gaseous fluid.

The filter is particularly effective for the filtration of gaseous fluids, and especially for the sterilisation of gases by filtration through materials such as glass wool, silica or quartz fibres. The gas, on passing from one compartment to the next, enters the empty space separating the permeable walls of facing compartments where its flow pattern is altered, for example by the appearance of turbulences. Each time it passes from one compartment to another, the filtered gas is redistributed, so that any channeling which may have occured upstream is destroyed.

Figure 2:
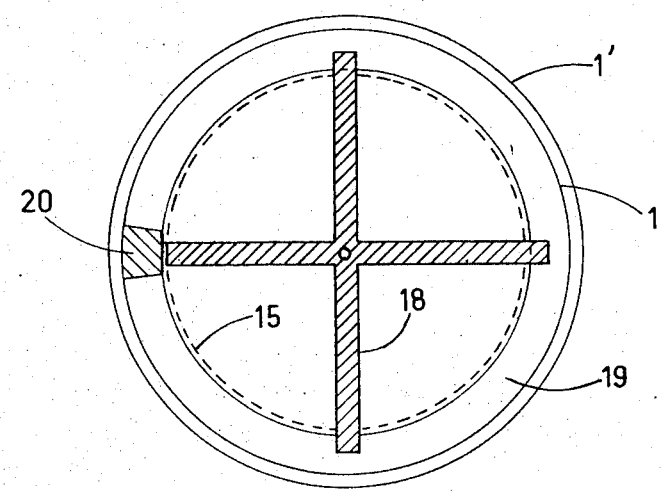

The accompanying drawings show, by way of example, one preferred form of a filter in accordance with the invention. In the drawings :

FIG. 1 is a view in axial section of the filter; and
FIG. 2 is a section taken along II—II of FIG. 1.

As is shown in FIGS. 1 and 2, the filtration apparatus in accordance with the invention comprises a cylindrical housing 1 provided with a jacket 1'. The ends 2 and 3 of the housing have inlet and outlet pipes 4 and 5 for the gaseous fluid. The space defined by the housing 1 and its ends 2 and 3 is divided into three zones : an inlet zone 6, a gaseous fluid outlet zone 7 and a central zone 8 filled with filter material 9. This filter material is disposed in three compartments arranged in series, namely an upstream compartment 10, a central compartment 11 and a downstream compartment 12. The upstream end of compartment 10 is made of a metal screen integral with the housing 1 and which supports the filter material 9, whereas the downstream face of the compartment 12 is made of a perforated metal sheet 14. The central compartment 11 is separated from the compartments 10 and 12 by the cylindrical chambers 15 having perforated sheet metal walls defining opposed ends of adjacent compartments. The cylindrical chambers 15 are reinforced by stays 16 integral with the axes 17 secured to the cross-pieces 18 which rest on flanges 19 secured to the housing 1. The four ends of the cross-pieces 18 retaining each chamber 15 and resting on each flange 19, are held in position by four abutments 20 integral with the housing 1.

The gaseous fluid passing through a compartment filled with filter material can only leave the compartment and pass into the next by traversing the chamber 15 of which the permeable walls define the opposed faces of these compartments, and is thus redistributed, thereby destroying any preferential channel formation which may have been produced in the upstream compartment.

Various other constructions of the filter according to the present invention are possible. For example, the redistribution chambers for the gaseous fluid may be defined by permeable plates, such as perforated sheet metal or metal screens acting as baffles and secured to the wall of the enclosure or, preferably, to collars integral with the enclosures. The number of these chambers may also be varied. Moreover, the filter may be of annular shape, with the filtration compartments being formed as concentric cartridges separated by annular redistribution chambers with the gaseous flux being radial.

The filter material, which is a gas-permeable material of fibrous or granular nature, or of porous structure such as, for example, a sintered material, may be selected having regard to the desired filtration characteristics and the nature of the impurities to be eliminated.

The filter according to the invention is particularly suitable for the sterilisation of gases. For this purpose, the different compartments of the filter may be filled with a filter material such as fibres of cotton, glass wool or asbestos, silica fibres or with a granular material such as carbon particles. Quartz fibres are also particularly effective for sterilisation.

The efficiency of the filter in accordance with the invention has been compared with that of a conventional filter filled with the same quantity of the same filter material. For the comparison, the respective penetration times were determined of a filter in accordance with the invention, comprising four compartments filled with quartz wool, with each compartment having a depth of 16 cm, and of a cylindrical filter of the same diameter filled with quartz wool and 64 cm deep. Air at ambient temperature contaminated with *Bacillus stearothermophilus* was fed to the filters at the same flow rate. the penetration times of the filter in accordance with the invention, measured for rates of flow of air corresponding to linear velocities of 15 cm/sec and 45 cm/sec, were five times greater than those of the cylindrical filter.

We claim:

1. In a filter for gaseous fluids, comprising an elongated cylindrical housing having an inlet at one end and an outlet at the other end, and at least two separate masses of a filter material disposed in spaced apart series arrangement within the housing and through which the gaseous fluid must flow in passage through said housing between the inlet and outlet thereof, the improvement of a cylindrically shaped walled member disposed in the space between successive ones of said filter material masses, said member including two parallel spaced apart circular walls extending traversely of the axis of said housing and being of lesser diameter than said housing, and an encircling cylindrical wall part extending between the edges of said two transversely disposed walls, said member being connected to a support secured to said housing, said support including crosspieces extending transversely of said housing and having ends received in annular abutment structure at the interior surface of said housing and extending radially inwardly in said housing to a location adjacent the cylindrical wall part of said member, the two spaced apart walls and cylindrical wall part being of permeable character whereby all flow of gaseous fluid from one mass of filter material to a successive mass must pass through said member to effect redistribution of said flow in passing from said one mass to said successive mass.

2. A filter according to claim 1, in which the walls of the cylindrically shaped member are made of one of perforated sheet metal and metallic screen material.

* * * * *